(12) United States Patent
Lo

(10) Patent No.: US 6,974,399 B2
(45) Date of Patent: Dec. 13, 2005

(54) HUB MOTOR MECHANISM

(76) Inventor: Chiu-Hsiang Lo, No. 20, Lane 305, Sec. 3, Chung-Sun Rd., Tan-Tz Shiang, Taichung Hsien (TW)

( * ) Notice: Subject to any disclaimer, the term of this patent is extended or adjusted under 35 U.S.C. 154(b) by 98 days.

(21) Appl. No.: 10/775,109

(22) Filed: Feb. 11, 2004

(65) Prior Publication Data

US 2005/0176542 A1     Aug. 11, 2005

(51) Int. Cl.[7] .......................... F16H 3/72; F16H 37/06; B60K 1/00; H02K 11/00; H02K 7/00
(52) U.S. Cl. ...................... 475/5; 180/65.5; 180/65.6; 180/65.7; 310/67 A; 310/67 R
(58) Field of Search ........ 475/4, 5, 10; 180/65.5–65.7; 310/66, 67 A, 67 R

(56) References Cited

U.S. PATENT DOCUMENTS

| | | | | |
|---|---|---|---|---|
| 3,812,928 A | * | 5/1974 | Rockwell et al. | .......... 180/65.5 |
| 3,897,843 A | * | 8/1975 | Hapeman et al. | .......... 180/65.5 |
| 5,246,082 A | * | 9/1993 | Alber | .......... 180/65.5 |
| 5,633,544 A | * | 5/1997 | Toida et al. | .......... 310/67 R |
| 5,691,584 A | * | 11/1997 | Toida et al. | .......... 310/67 R |
| 6,276,475 B1 | * | 8/2001 | Nakanosono | .......... 180/65.8 |
| 6,296,072 B1 | * | 10/2001 | Turner | .......... 180/220 |
| 6,355,996 B1 | * | 3/2002 | Birkestrand | .......... 310/54 |
| 6,749,532 B2 | * | 6/2004 | Wachauer | .......... 475/5 |

FOREIGN PATENT DOCUMENTS

DE          19805679 A1 *  8/1999  ............ B60K 1/00

* cited by examiner

*Primary Examiner*—Tisha Lewis
(74) *Attorney, Agent, or Firm*—Rosenberg, Klein & Lee

(57) ABSTRACT

An electrically driven hub includes an electrical mechanism including an electrical motor and a planetary gear system connected to the electrical mechanism. A first fixed shaft is connected to the stator of the electrical motor and a second fixed shaft is connected to a second end of the stator of the electrical motor. The first and second fixed shafts are connected to the vehicle frame. A one-way clutch is connected between a cover of the hub and the planetary gear system so that the hub is rotated when the planetary gear system is activated by the motor.

10 Claims, 5 Drawing Sheets

US 6,974,399 B2

HUB MOTOR MECHANISM

FIELD OF THE INVENTION

The present invention relates to a hub motor mechanism for driving a wheeled vehicle such as a bicycle or a wheelchair, and the transmission system of the hub motor is efficient and has low noise.

BACKGROUND OF THE INVENTION

A conventional hub motor is disclosed in U.S. Pat. No. 6,321,863 and includes an electrical motor received in a hub which is driven by the electrical motor. Nevertheless, the lack of better speed changing system for the conventional hub motor, electrical motor wastes too much electric power and the efficiency of the rotation of the hub is not satisfied. Some alternative inventions for the hub motors are disclosed in U.S. Pat. No. 4,294,138 and 5,273,500. Although a planetary gear system is used in these inventions, the lack of the use of electrical motor makes the hub be inconvenient in practical use.

The present invention intends to provide a hub assembly which is driven by an electrical motor. A planetary gear system is connected with the electrical motor so as to smoothly and efficiently rotate the hub.

SUMMARY OF THE INVENTION

The present invention relates to an electrically driven hub which comprises a hub and an electrical mechanism is received in the hub and comprises an electrical motor including a stator and a rotor which is rotated relative to the stator. A first fixed shaft is connected to a first end of the stator and a second fixed shaft is connected to a second end of the stator. An output shaft is connected to the rotor and drives a sun gear of a planetary gear system. A support board is fixed to the stator and has a plurality of planet gears connected thereto which is matched with the sun gear. A sub-gear is co-axially connected to each of the planet gears.

A gear ring for driving the hub has teeth defined in an inner periphery thereof and the teeth are matched with the sub-gears. Two bearings are respectively connected to the first fixed shaft and the second fixed shaft and the hub so that the hub is rotatable relative to the electrical mechanism.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
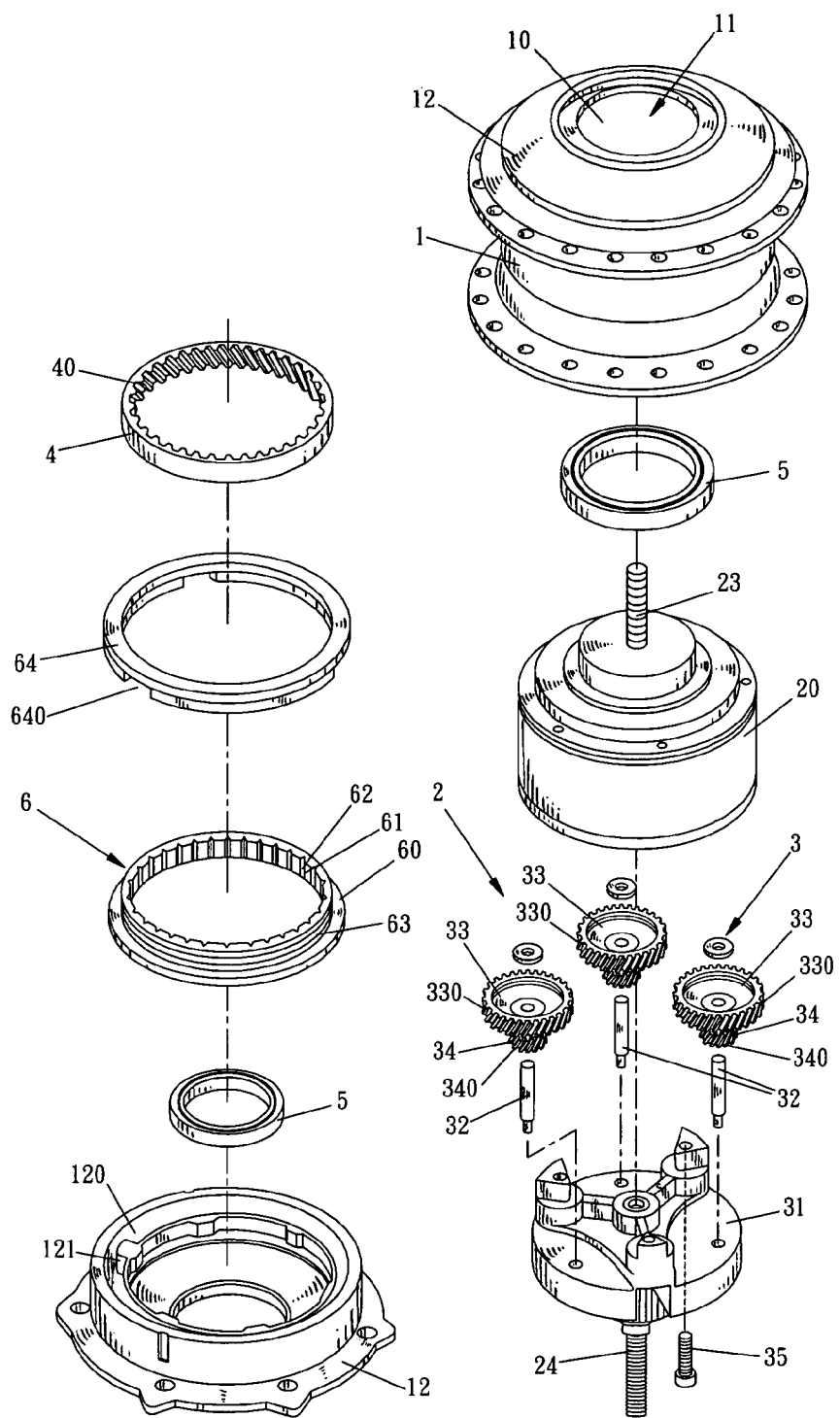
FIG. 1 is an exploded view to show the electrically driven hub of the present invention.
Figure 2:
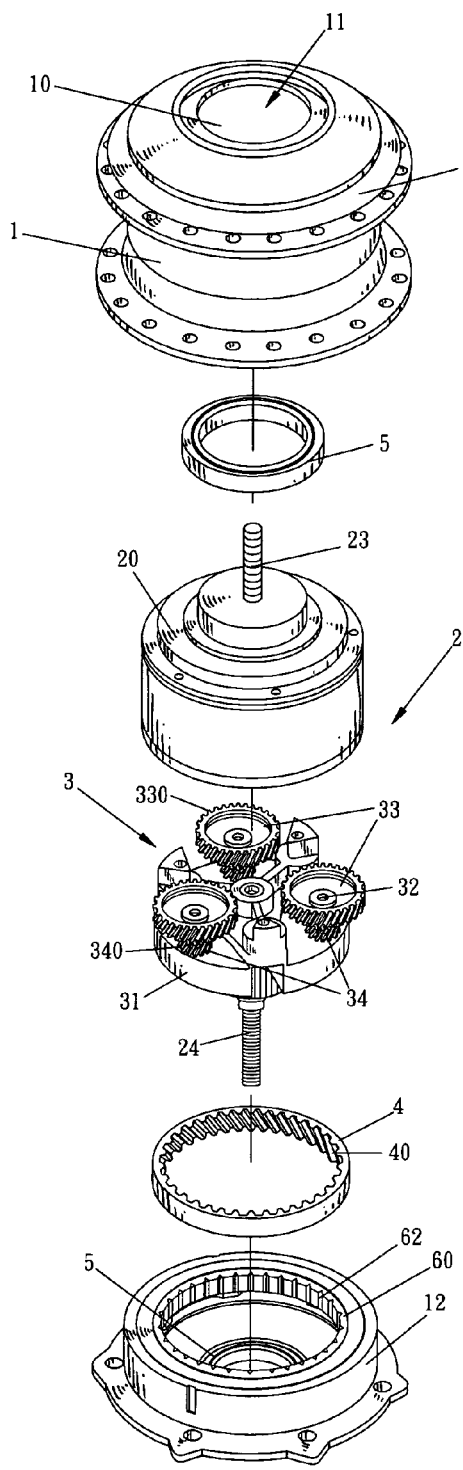
FIG. 2 is another exploded view of the electrically driven hub of the present invention.
Figure 3:
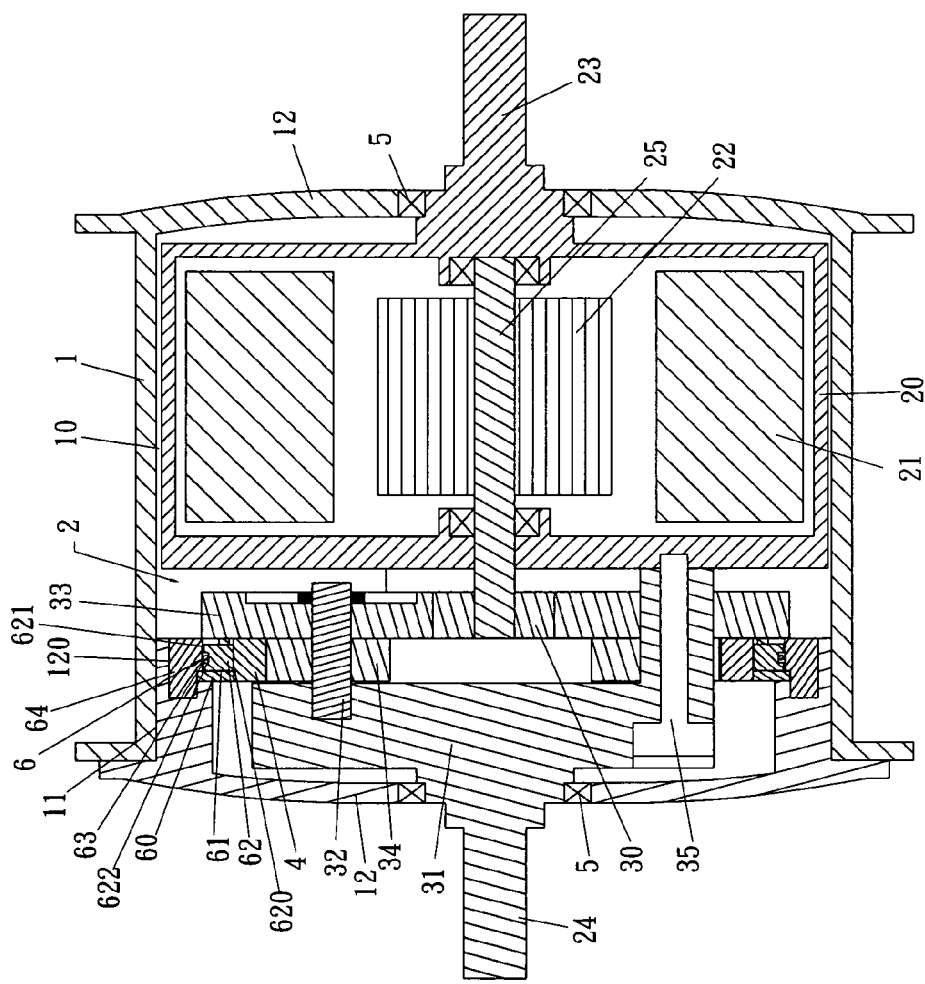
FIG. 3 is a cross sectional view to show the electrically driven hub of the present invention.
Figure 4:
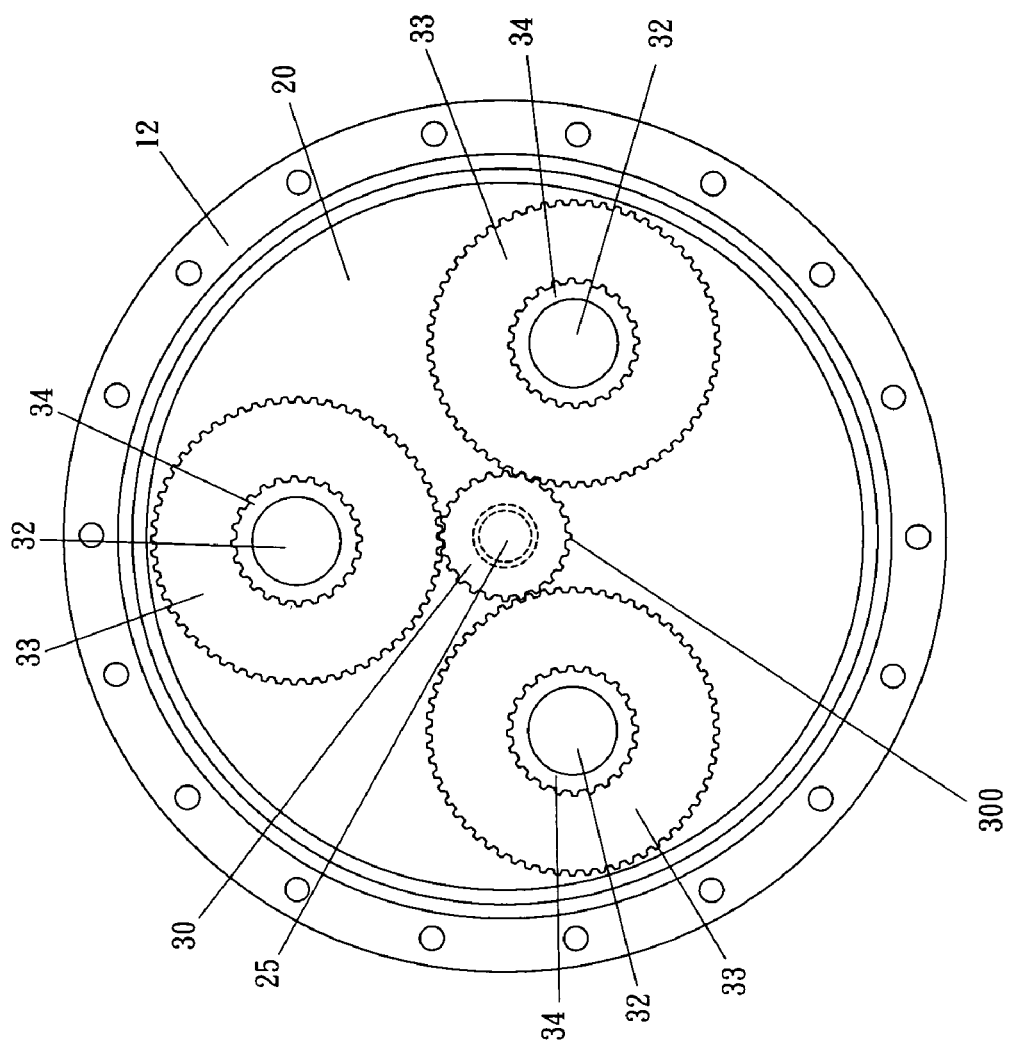
FIG. 4 shows the arrangement of the planetary gear system.
Figure 5:
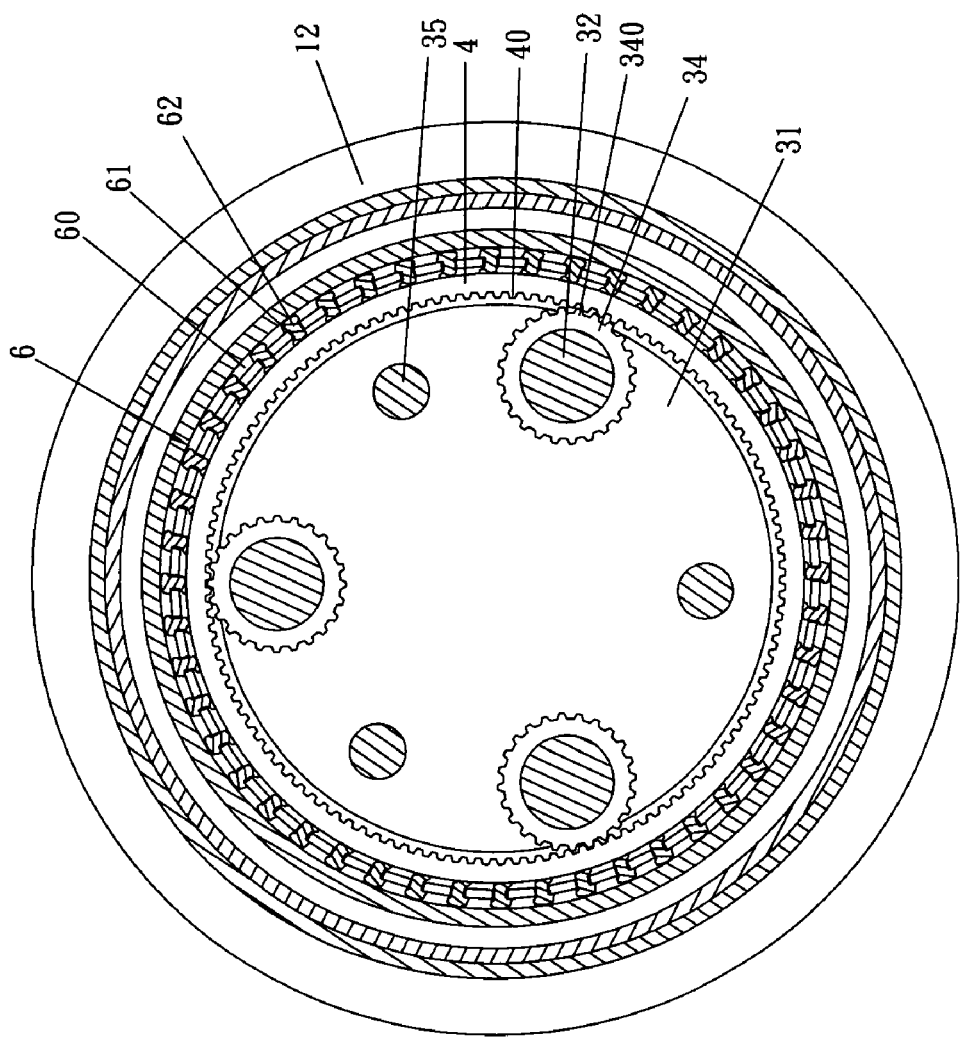
FIG. 5 shows connection of the one-way clutch and the gear ring of the electrically driven hub of the present invention.

Referring to FIGS. 1 to 5, the electrically driven hub of the present invention comprises a hub 1 having a chamber 10 defined therein and a cover 12 is connected to an open side 11 of the hub 1 to seal the chamber 10. An electrical mechanism 2 is received in the chamber 10 so as to drive the hub 1 and comprises an electrical motor 20 which includes a stator 21 and a rotor 22 which is rotated relative to the stator 21. A first fixed shaft 23 is connected to a first end of the stator 21 and a second fixed shaft 24 is connected to a second end of the stator 21. An output shaft 25 is connected to the rotor 22 and drives a planetary gear system 3. The fixed shaft 23, the second shaft 24 and the output shaft 25 share a common axis.

The planetary gear system 3 has a sun gear 30 which is mounted to the output shaft 25. A support board 31 is fixed to the stator 21 and the second fixed shaft 24 is connected to the support board 31. The first fixed shaft 23 extends from an end of the hub 1 and the second fixed shaft 24 extends through the cover 12. The first fixed shaft 23 and the second fixed shaft 24 are connected to a vehicle frame such as a bicycle frame or a wheelchair frame. A plurality of planet gears 33 are connected to the support board 31 by pivotal rods 32 which extend through the support board 31. A sub-gear 34 is co-axially connected to each of the planet gears 33. The support board 31 is fixed to the motor 20 by bolts 35. The sun gear 30 is matched with the planet gears 33.

A gear ring 4 for driving the hub 1 has teeth 40 defined in an inner periphery thereof, and the teeth 40 are matched with the sub-gears 34. In order to reduce the noise of the gears, teeth 300 of the sun gear 30, teeth 330 of the planet gears 33, the teeth 40 of the gear ring 4 and teeth 340 of the sub-gears 34 are bevel teeth.

Two bearings 5 such as one-way bearings 5 are respectively connected to the first fixed shaft 23 and the second fixed shaft 24 and the hub 1 so that the hub 1 is rotatable relative to the electrical mechanism 2. One of the bearings 5 is located between the first fixed shaft 23 and the cover 12 of the hub 1, the other bearing 5 is located between the second shaft 24 and the cover 12.

A one-way clutch 6 is connected between the hub 1 and the electrical mechanism 2 wherein the clutch 6 is located between the gear ring 4 and the hub 1 and includes a positioning ring 60 mounted to an outer periphery of the gear ring 4. A plurality of holes 61 are defined in the gear ring 4 so that a plurality of pawl members 62 are pivotably engaged with the holes 61 in the positioning ring 60. A first end 620 of each of the pawl members 62 contacts the outer periphery of the gear ring 4 and drives the gear ring 4 in one direction. A second end 621 of each of the pawl members 62 has a recess 622 and is accessible from an outer periphery of the positioning ring 60. A flexible ring 63 is engaged with the recesses 622 of the pawl members 62 and a fixed ring 64 is mounted to the positioning ring 60 and fixed to the cover 12. The fixed ring 64 of the one-way clutch 6 includes a plurality of notches 640 and the cover 12 has an annular groove 120 so as to receive the fixed ring 64 therein. A plurality of blocks 121 are located in the annular groove 120 and the notches 640 of the fixed ring 64 are engaged with the blocks 121.

The cooperation of the planetary gear system 3 and the electrical motor 20 improves the transmitting efficiency and the output torque of the hub 1. The burden of the electrical motor 20 is reduced due to the efficient transmittance so that the term of use of the electrical motor 20 can be extended.

While we have shown and described the embodiment in accordance with the present invention, it should be clear to those skilled in the art that further embodiments may be made without departing from the scope of the present invention.

What is claimed is:

1. An electrically driven hub comprising:
    a hub (1) having a chamber (10) defined therein and a cover (12) connected to the hub (1) to seal the chamber (10);
    an electrical mechanism (2) received in the chamber (10) so as to drive the hub (1) and comprising an electrical motor (20) including a stator (21) and a rotor (22) which is rotated relative to the stator (21), a first fixed shaft (23) connected to a first end of the stator (21) and a second fixed shaft (24) connected to a second end of the stator (21), an output shaft (25) connected to the rotor (22);
    a planetary gear system (3) having a sun gear (30) which is mounted to the output shaft (25), a support board (31) fixed to the electrical motor (20) and having a plurality of planet gears (33) connected thereto by pivotal rods (32), and the sun gear (30) matched with the planet gears (33), a sub-gear (34) co-axially connected to each of the planet gears (33);
    a gear ring (4) for driving the hub (1) and having teeth (40) defined in an inner periphery thereof, the teeth (40) matched with the sub-gears (34), and
    two bearings (5) respectively connected to the first fixed shaft (23) and the second fixed shaft (24) and the hub (1) so that the hub (1) is rotatable relative to the electrical mechanism (2).

2. The hub as claimed in claim 1, wherein a one-way clutch (6) is connected between the hub (1) and the electrical mechanism (2).

3. The hub as claimed in claim 2, wherein the clutch (6) is located between the gear ring (4) and the hub (1) and includes a positioning ring (60) mounted to an outer periphery of the gear ring (4), a plurality of holes (61) defined in the gear ring (4);
    a plurality of pawl members (62) pivotably engaged with the holes (61) in the positioning ring (60), a first end (620) of each of the pawl members (62) contacting the outer periphery of the gear ring (4) for driving the gear ring (4) in one direction, a second end (621) of each of the pawl members (62) having a recess (622) and being accessible from an outer periphery of the positioning ring (60);
    a flexible ring (63) engaged with the recesses (622) of the pawl members (62), and
    a fixed ring (64) mounted to the positioning ring (60) and fixed to the cover (12).

4. The hub as claimed in claim 3, wherein the fixed ring (64) of the one-way clutch (6) includes a plurality of notches (640) and the cover (12) has an annular groove (120) so as to receive the fixed ring (64) therein, a plurality of blocks (121) located in the annular groove (120) and the notches (640) of the fixed ring (64) being engaged with the blocks (121).

5. The hub as claimed in claim 1, wherein the bearings (5) are one-way bearings.

6. The hub as claimed in claim 1, wherein the teeth (40) of the gear ring (4) and teeth (340) of the sub-gears (34) are bevel teeth.

7. The hub as claimed in claim 1, wherein teeth (300) of the sun gear (30) and teeth (330) of the planet gears (33) are bevel teeth.

8. The hub as claimed in claim 1, wherein the fixed shaft (23), the second fixed shaft (24) and the output shaft (25) share a common axis.

9. The hub as claimed in claim 1, wherein the second fixed shaft (24) is connected to the support board (31).

10. The hub as claimed in claim 1, wherein one of the bearings (5) is located between the first fixed shaft (23) and the cover (12) of the hub (1), the other bearing (5) is located between the second fixed shaft (24) and the cover (12).

* * * * *